United States Patent
Liang et al.

(10) Patent No.: US 10,620,722 B2
(45) Date of Patent: Apr. 14, 2020

(54) METHOD FOR DETERMINING TARGET OPERATING FREQUENCY OF STYLUS, AND TOUCH SCREEN AND STYLUS THEREOF

(71) Applicant: SHENZHEN GOODIX TECHNOLOGY CO., LTD., Shenzhen (CN)

(72) Inventors: Zhibing Liang, Shenzhen (CN); Wangwang Yang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 121 days.

(21) Appl. No.: 15/697,232

(22) Filed: Sep. 6, 2017

(65) Prior Publication Data
US 2018/0120961 A1    May 3, 2018

Related U.S. Application Data

(63) Continuation of application No. PCT/CN2016/104316, filed on Nov. 2, 2016.

(51) Int. Cl.
| | |
|---|---|
| *G06F 3/041* | (2006.01) |
| *G06F 3/046* | (2006.01) |
| *G06F 3/0354* | (2013.01) |
| *G06F 3/044* | (2006.01) |

(52) U.S. Cl.
CPC .......... *G06F 3/03545* (2013.01); *G06F 3/044* (2013.01); *G06F 3/0412* (2013.01); *G06F 3/0416* (2013.01)

(58) Field of Classification Search
CPC .......... G06F 3/046; G06F 3/041; G06F 3/045; H05K 1/02; H05K 3/28; H05K 3/10
See application file for complete search history.

(56) References Cited

U.S. PATENT DOCUMENTS

| | | | |
|---|---|---|---|
| 9,939,975 B2 * | 4/2018 | Ye | ......... G06F 3/0416 |
| 2008/0309628 A1 | 12/2008 | Krah et al. | |
| 2010/0155153 A1 | 6/2010 | Zachut | |
| 2012/0050207 A1 | 3/2012 | Westhues et al. | |
| 2012/0068964 A1 | 3/2012 | Wright et al. | |

(Continued)

FOREIGN PATENT DOCUMENTS

| | | |
|---|---|---|
| CN | 103534670 A | 1/2014 |
| CN | 104571732 A | 4/2015 |

(Continued)

*Primary Examiner* — Pegeman Karimi

(57) ABSTRACT

A method for determining a target operating frequency of a stylus, and a touch screen and a stylus thereof are disclosed, pertaining to the field of touch technologies. According to embodiments of the present application, a touch screen receives a search signal sent by the stylus and detects the frequency of the search signal, and judges whether the frequency of the search signal is equal to a target operating frequency of the touch screen; and if the frequency of the search signal is equal to the target operating frequency, the touch screen sends a response signal to the stylus, whereupon the stylus determines a current operating frequency thereof as the target operating frequency. As compared with the related art, the method has the advantages such as simple use, high reliability and the like.

18 Claims, 9 Drawing Sheets

(56) References Cited

U.S. PATENT DOCUMENTS

| | | | |
|---|---|---|---|
| 2012/0105362 A1* | 5/2012 | Kremin | G06F 3/03545 345/174 |
| 2012/0154340 A1 | 6/2012 | Vuppu et al. | |
| 2013/0207938 A1* | 8/2013 | Ryshtun | G06F 3/0416 345/179 |
| 2014/0098033 A1 | 4/2014 | Simmons | |
| 2015/0363012 A1* | 12/2015 | Sundara-Rajan | G06F 3/038 345/179 |
| 2016/0004338 A1* | 1/2016 | Hsu | G06F 3/03545 345/173 |
| 2016/0239123 A1 | 8/2016 | Ye et al. | |

FOREIGN PATENT DOCUMENTS

| | | |
|---|---|---|
| CN | 105320299 A | 2/2016 |
| CN | 205281423 U | 6/2016 |
| EP | 2466431 A1 | 6/2012 |
| WO | 2014018185 A2 | 1/2014 |
| WO | 2014018185 A3 | 1/2014 |
| WO | 2014018232 A1 | 1/2014 |

\* cited by examiner

METHOD FOR DETERMINING TARGET OPERATING FREQUENCY OF STYLUS, AND TOUCH SCREEN AND STYLUS THEREOF

CROSS-REFERENCE TO RELATED APPLICATIONS

This application is a continuation of International Patent Application No. PCT/CN2016/104316, with an international filing date of Nov. 2, 2016, which is hereby incorporated by reference in its entirety.

TECHNICAL FIELD

The present application relates to the field of touch technologies, and in particular, relates to a method for determining a target operating frequency of a stylus, and a touch screen and a stylus thereof.

BACKGROUND

In a system including a touch screen and an active stylus (which is hereinafter referred to as a stylus), the touch screen is subject to noise at some frequencies. In practice, the touch screen needs to avoid work at a frequency with loud noise, and a frequency with low noise (that is, a target frequency) needs to be selected as the operating frequency of the touch screen. Likewise, the stylus should send signals to the touch screen using other frequencies instead of those with great noise, and may send signal using the same frequency of the target operating signal of the touch screen.

To ensure that the touch screen and the stylus operate at the same target operating frequency, generally a suitable operating frequency may be selected for the stylus by a user. For example, the user may select a suitable operating frequency by means of keys. For example, the user presses the key once to switch the operating frequency once, until the touch screen normally makes a response to the operation of the stylus. If a response is made, it means the touch screen and the stylus operate at the same target operating frequency. However, in this method, the user needs to manually adjust the operating frequency of the stylus.

To prevent manually adjustment of the operating frequency of the stylus, improve user experience and accommodate smartness-orientation of the products, an automatic adjustment mechanism is set in the related art. That is, the target operating frequency of the stylus is determined by means of communication between the touch screen and the stylus. This automatic adjustment mechanism specifically included: respectively detecting noise information at a plurality of operating frequency of the stylus by the touch screen; and determining the target operating frequency according to the noise information by the touch screen. The touch screen sends the target operating frequency to the stylus in the form of pulse signal, and adjusts the operating frequency of the stylus to the target operating frequency, such that the stylus and the touch screen operate at the same target operating frequency.

Although no manual operation is needed in the above method, two problems are present:

1. According to the mechanism of orthogonal demodulation, in the process of the automatic adjustment, if the frequency at which the touch screen sends a pulse signal is different from the currently selected operating frequency of the stylus, the stylus may fail to receive and demodulate the code of the target operating frequency correctly.

2. If the frequency at which the touch screen sends a pulse signal causes great noise on the touch screen, the stylus may fail to receive and demodulate code information of the target operating frequency correctly.

Therefore, in the system including a touch screen and a stylus, how to provide a method for determining a target operating frequency of a stylus to overcome the above defects is a problem to be urgently solved in the touch technologies.

SUMMARY

In view of the above, one of the technical problems to be solved by embodiments of the present application is to provide a method for determining a target operating frequency of a stylus, to solve the defect in the related art and achieve the effect of simplicity and smartness.

Embodiments of the present application provide a method for determining a target operating frequency of a stylus, applied to a touch screen. The method includes:

receiving a search signal sent by the stylus and detecting a frequency of the search signal, and judging whether the frequency of the search signal and a target operating frequency of the touch screen satisfy a predetermined first corresponding relationship; and enabling the stylus to determine the target operating frequency of the stylus according to the predetermined first corresponding relationship and the frequency of the search signal if the frequency of the search signal and the target operating frequency of the touch screen satisfy the predetermined first corresponding relationship.

Embodiments of the present application provide a method for determining a target operating frequency of a stylus, applied to the stylus. The method includes:

sending a search signal to a touch screen; and determining the target operating frequency of the stylus according to a predetermined first corresponding relationship and a frequency of the search signal if the frequency of the search signal and a target operating frequency of the touch screen satisfy the predetermined first corresponding relationship.

Embodiments of the present application further provide a touch screen. The touch screen includes:

a search receiving module, configured to receive a search signal sent by a stylus, and detect a frequency of the search signal;

a search comparing module, configured to judge whether the frequency of the search signal and a target operating frequency of the touch screen satisfy a predetermined first corresponding relationship; and a frequency setting module, configured to enable the stylus to determine the target operating frequency of the stylus according to the predetermined first corresponding relationship and the frequency of the search signal if the frequency of the search signal and the target operating frequency of the touch screen satisfy the predetermined first corresponding relationship.

Embodiments of the present application provide a stylus. The stylus includes:

a search sending module, configured to send a search signal to a touch screen; and a frequency configuring module, configured to determine the target operating frequency of the stylus according to a predetermined first corresponding relationship and a frequency of the search signal if the frequency of the search signal and a target operating frequency of the touch screen satisfy the predetermined first corresponding relationship.

As seen from the above technical solutions, embodiments of the present application provide a method for determining a target operating frequency of a stylus, and a touch screen and a stylus thereof. According to the embodiments of the present application, the touch screen receives a search signal sent by the stylus and detects a frequency of the search signal, and judges whether the frequency of the search signal is equal to a target operating frequency of the touch screen. If the frequency of the search signal is equal to the target operating frequency, a response signal is sent to the stylus, such that the stylus determines a current frequency thereof as the target operating frequency. As compared with the related art, the method has the advantages such as simple use, high reliability and the like.

BRIEF DESCRIPTION OF THE DRAWINGS

To describe technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein.

DETAILED DESCRIPTION

Embodiments of the present application provide a method for determining a target operating frequency of a stylus. The method includes: receiving a search signal sent by the stylus and detecting a frequency of the search signal, and judging whether the frequency of the search signal is equal to a target operating frequency of the touch screen. If the frequency of the search signal is equal to the target operating frequency, a response signal is sent to the stylus, such that the stylus determines a current operating frequency thereof as the target operating frequency. As compared with the related art, the method has the advantages such as simple use, high reliability and the like.

Nevertheless, it is not necessary to require that any technical solution according to the embodiments of the present application achieves all of the above technical effects simultaneously.

To make a person skilled in the art better understand the technical solutions of embodiments of the present application, the technical solutions of the present application are clearly and completely described with reference to the accompanying drawings of the embodiments of the present application. Obviously, the embodiments described herein are merely exemplary ones, but are not all the embodiments of the present application. Based on the embodiments of the present application, all other embodiments derived by persons of ordinary skill in the art without any creative efforts shall fall within the protection scope of the present application.

Figure 1:
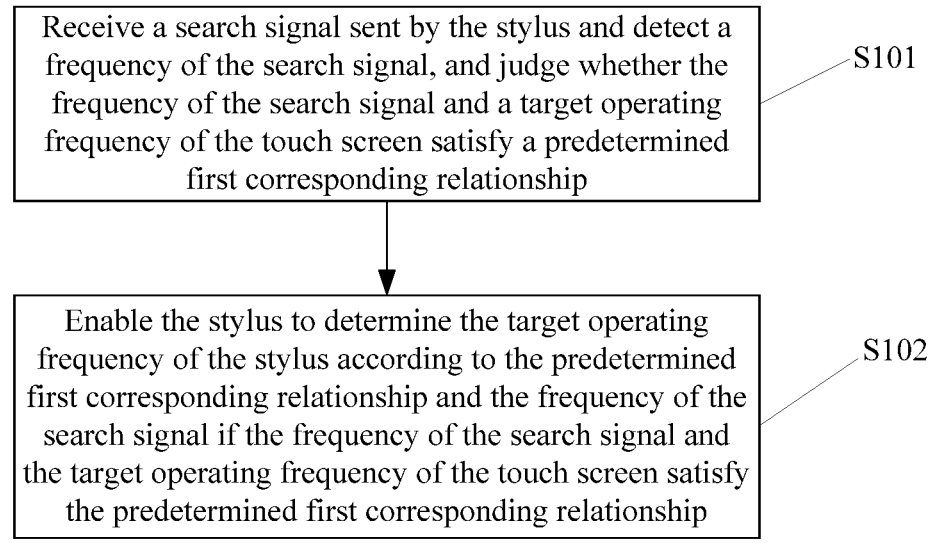
FIG. 1 is a schematic flowchart of a method for determining a target operating frequency of a stylus according to one embodiment of the present application.

Referring to FIG. 1, one embodiment of the present application provides a method for determining a target operating frequency of a stylus, applied to a touch screen. The method includes:

S101: receiving a search signal sent by the stylus and detecting a frequency of the search signal, and judging whether the frequency of the search signal and a target operating frequency of the touch screen satisfy a predetermined first corresponding relationship; and S102: enabling the stylus to determine the target operating frequency of the stylus according to the predetermined first corresponding relationship and the frequency of the search signal if the frequency of the search signal and the target operating frequency of the touch screen satisfy the predetermined first corresponding relationship.

When the touch screen operates in cooperation with the stylus, frame synchronization needs to be ensured between the stylus and the touch screen. That is, the stylus and the touch screen need to operate at the same frequency, to ensure that the touch screen accurately acquires touch information from the stylus. To ensure that the stylus and the touch screen need to operate at the same frequency, this embodiment discloses determining the target operating frequency of the stylus on the side of the touch screen.

Specifically, the stylus may be firstly enabled to generate a corresponding pulse signal according to the current operating frequency of the stylus, that is, the search signal. The frequency of the search signal is obtained via modulation according to the current operating frequency of the stylus, and then the stylus sends the corresponding search signal to the touch screen. The touch screen receives the search signal, and counts the number of pulses per second in the search signal to acquire the frequency of the search signal. The touch screen judges whether the frequency of the search signal and the target operating frequency of the touch screen satisfy the predetermined first corresponding relationship, to obtain a judgment result. If it is judged that the frequency of the search signal and the target operating frequency of the touch screen satisfy the predetermined first corresponding relationship, the stylus obtains via calculation the target operating frequency of the touch screen according to the predetermined first corresponding relationship and the frequency of the search signal, and determines the target operating frequency of the touch screen as the target operating frequency of the stylus.

The predetermined first corresponding relationship may be any determined mapping relationship. For example, y=N*x. y denotes the target operating frequency of the touch screen, x denotes the frequency of the search signal, and N denotes any fixed value. When the frequency of the search signal and the target operating frequency of the touch screen satisfy the predetermined first corresponding relationship, the stylus may be enabled to determine the target operating frequency of the stylus according to the fixed value N and the frequency x of the search signal.

Specifically, step S2 specifically includes: enabling the stylus to determine the frequency of the search signal as the target operating frequency of the stylus if the frequency of the search signal is equal to the target operating frequency of the touch screen. In this way, the calculation operation of the stylus may be effectively simplified.

In this embodiment, the touch screen sends a corresponding response signal to the stylus according to the judgment result, and the response signal is acquired via modulation according to the target operating frequency of the touch screen.

In addition, a person skilled in the art would also trigger the stylus to determine the target operating frequency of the stylus in other manners according to the predetermined first corresponding relationship and the frequency of the search signal. For example, a flag bit is set in the touch screen, and the stylus acquires a flag bit state whereupon the stylus is triggered to determine the target operating frequency of the stylus according to the predetermined first corresponding relationship and the frequency of the search signal.

In this embodiment, if the target operating frequency of the touch screen and the frequency of the search signal sent by the stylus satisfy the predetermined first corresponding relationship, the stylus may be enabled to acquire the target operating frequency of the touch screen, and determine the current operating frequency of the touch screen as the target operating frequency of the stylus. As compared with the related art, the complicated operation of manually setting the target operating frequency of the stylus is not needed, which overcome the defect that reception and demodulation of the target operating frequency may not be achieved when a sender and a receiver use different operating frequencies during an orthogonal demodulation. In addition, in this embodiment, different styluses may all be used on the touch screen.

Figure 2:
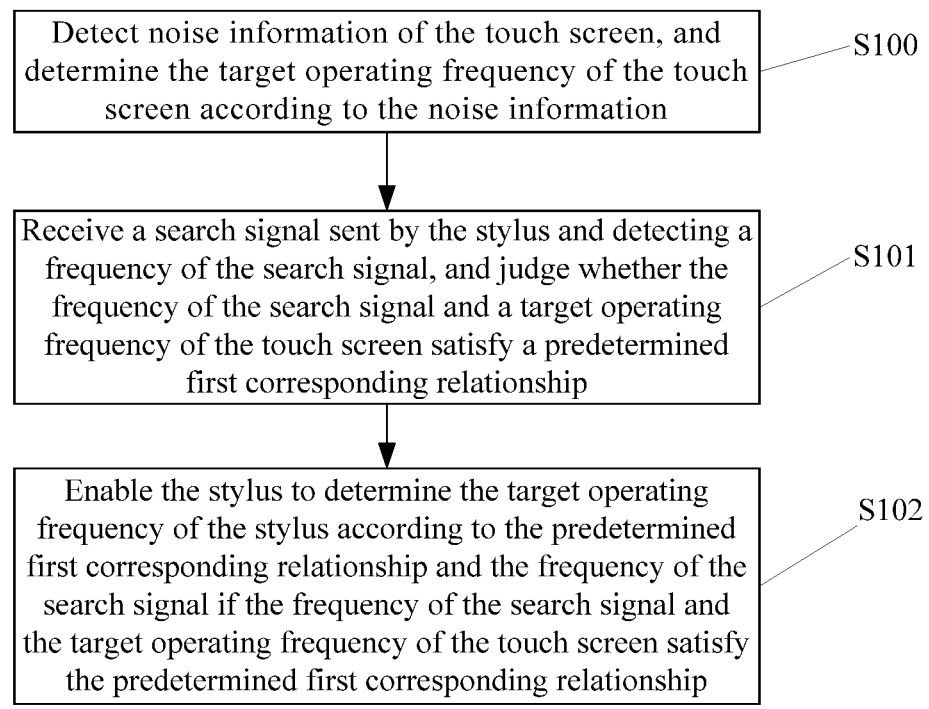
FIG. 2 is a schematic flowchart of a method for determining a target operating frequency of a stylus according to another embodiment of the present application.

Referring to FIG. 2, another embodiment of the present application provides a method for determining a target operating frequency of a stylus, applied to a touch screen. Prior to step S101, the method further includes:

S100: detecting noise information of the touch screen, and determining the target operating frequency of the touch screen according to the noise information.

When the touch screen operates in cooperation with the stylus, if great noise is present in the operating environment of the stylus and the touch screen, for example, LCD noise of the touch screen, and the frequency of the noise is equal to the target operating frequency of the touch screen and the stylus, normal operations of the touch screen and the stylus may be affected. For example, the touch screen may not correctly acquire touch information of the stylus. Therefore, noise monitoring needs to be carried out via the touch screen to avoid frequency points with great noise, and select a frequency with less noise as the target operating frequency of the touch screen.

Figure 3:
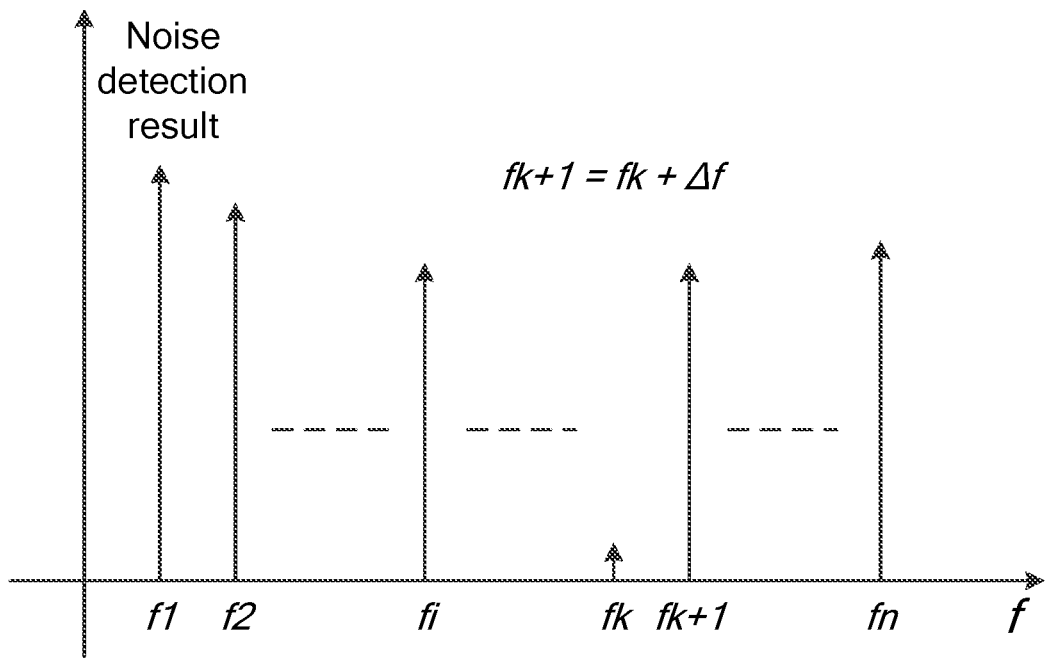
FIG. 3 is a noise distribution map obtained by a noise detecting module according to some embodiment of the present application.

Specifically, referring to FIG. 3, FIG. 3 is a noise distribution map obtained by a noise detecting module according to some embodiment of the present application. In this embodiment, before the touch screen receives the search signal sent by the stylus, noise information on the touch screen is detected to acquire noise information on the touch screen. Frequency points f1, f2, fi, fk+1 and fn on the touch screen are all subject to great noise, and thus need to be avoided in use. Frequency point fk is subject to less noise, and thus fk may be selected as the target operating frequency. fk is selected as the target operating frequency of the touch screen, such that the stylus operates at the target operating frequency. As such, convenience is brought to users, and reliability of communication between the stylus and the terminal of the touch screen is improved.

Still another embodiment of the present application provides a method for determining a target operating frequency of a stylus, applied to a touch screen. In this embodiment, step S100 specifically includes:

detecting a noise strength of the touch screen at each frequency, and setting a frequency with the noise strength lower than a predetermined strength threshold among the detected noise strengths as the target operating frequency of the touch screen.

The detecting a noise strength of the touch screen at each frequency, and setting a frequency with the noise strength lower than a predetermined strength threshold among the detected noise strengths as the target operating frequency of the touch screen specifically includes:

detecting the noise strengths of the touch screen at each frequency, and selecting a frequency which the hopping of the stylus most quickly reach as the target operating frequency of the touch screen if there is more than one frequency at which the noise strength the minimum.

To enable the touch screen and the stylus to operate at an optimal operating frequency, the touch screen may be enabled to detect noise on the touch screen at each frequency. Specifically, selecting the frequency point with the least noise as the target operating frequency may be implemented using a compare function. Assuming that a frequency point set on the touch screen is {f1,f2, i-fi, . . . fn}, noise strengths at frequency points f1, f2, . . . , fi, . . . , fn are respectively set as P(f1), P(f2), . . . , P(fi), and P(fn), and a variant Min is set. Firstly, assuming that Min=P(f1), then Min is compared respectively to P(f2), P(fi), and P(fn). When Min is greater than any P(fk), it is assumed that Min is equal to P(fk). Afterwards, the modified Min is compared with the remaining noise strengths, until Min is compared with P(fn). In this case, the frequency corresponding to Min is the frequency with the least noise, and this frequency is set as the target operating frequency.

Nevertheless, in the above method, a plurality of frequencies with the least noise may be present. Under such circumstance, a further step needs to be performed. That is, the frequencies among f1, f2, . . . , fi, . . . fn with the noise equal to the final value of Min are selected as candidate operating frequencies of the target operating frequency.

Upon determination of the candidate operating frequencies of the target operating frequency, if the frequency of the search signal sent by the stylus and any one of the candidate operating frequencies satisfy the predetermined first corresponding relationship, the stylus is enabled to determine the target operating frequency of the stylus according to the predetermined first corresponding relationship and the frequency of the search signal. If the frequency of the search signal sent by the stylus and any one of the candidate operating frequencies do not satisfy the predetermined first corresponding relationship, the stylus hops to a next operating frequency via the hopping function. The touch screen may judge, according to all the candidate operating frequencies, the modulation method of the frequency of the search signal, the predetermined first corresponding relationship and the hopping function of the stylus, which candidate operating frequency would be firstly selected for the stylus, and determines the candidate operating frequency as the target operating frequency.

In this embodiment, the frequency with the least noise is set as the target operating frequency, such that reliability of communication between the stylus and the terminal of the touch screen is further improved.

Still another embodiment of the present application provides a method for determining a target operating frequency of a stylus, applied to a touch screen. In this embodiment, step S100 specifically includes:

detecting a noise strength of the touch screen at each frequency, and setting a frequency with the noise strength lower than a predetermined strength threshold among the detected noise strengths as the target operating frequency of the touch screen.

The detecting a noise strength of the touch screen at each frequency, and setting a frequency with the noise strength lower than a predetermined strength threshold among the detected noise strengths as the target operating frequency of the touch screen specifically includes:

detecting the noise strengths of the touch screen at each frequency, and selecting a frequency which the hopping of the stylus most quickly reaches as the target operating frequency of the touch screen if there is more than one frequency at which the noise strength is lower than the predetermined noise threshold.

In this embodiment, a noise strength threshold needs to be defaulted, and then the frequency at which the noise strength is lower than the noise strength threshold is selected from each frequency as the target operating frequency. Nevertheless, there may be more than one frequency at which the noise strength is lower than the noise strength threshold. The processing method is similar to that described in the above embodiment, which is thus not described herein any further. In this embodiment, a threshold is predetermined, and thus the step that the touch screen detects the frequency with the minimum noise strength may be not needed, which simplifies the step of determining the target operating frequency, improves communication efficiency between the stylus and the terminal of the touch screen, and accelerates determination of the target operating frequency.

The definition of the noise strength in any of the above embodiments needs to be clarified herein. In this embodiment, the noise is converted into a corresponding electrical signal, and some parameters of the noise electrical signal are used as indicators for characterizing the noise strength, for example, voltage, energy, variance, power and the like.

Figure 4:
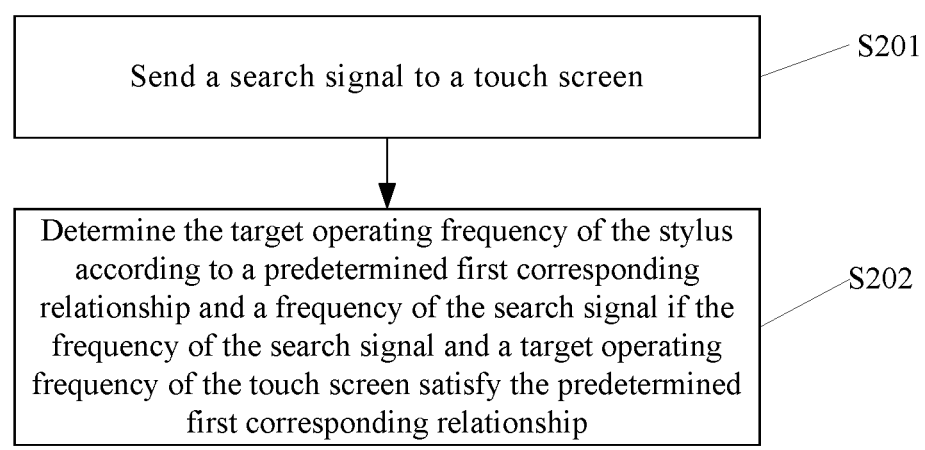
FIG. 4 is a schematic flowchart of a method for determining a target operating frequency of a stylus according to still another embodiment of the present application.

Referring to FIG. 4, one embodiment of the present application provides a method for determining a target operating frequency of a stylus, applied to the stylus. The method includes:

S201: sending a search signal to a touch screen; and

S202: determining the target operating frequency of the stylus according to a predetermined first corresponding relationship and a frequency of the search signal if the frequency of the search signal and a target operating frequency of the touch screen satisfy the predetermined first corresponding relationship.

When the stylus operates in cooperation with the touch screen, frame synchronization needs to be ensured between the stylus and the touch screen. That is, the stylus and the touch screen need to operate at the same frequency, to ensure that the stylus accurately sends touch information to the touch screen. To ensure that the stylus and the touch screen need to operate at the same frequency, this embodiment discloses determining the target operating frequency of the stylus on the side of the stylus.

Specifically, the stylus may be firstly enabled to generate a corresponding pulse signal according to the current operating frequency of the stylus, that is, the search signal. The frequency of the search signal is obtained via modulation according to the current operating frequency of the stylus, and then the stylus sends the corresponding search signal to the touch screen. The touch screen receives the search signal and detects the frequency of the search signal. The touch screen judges whether the frequency of the search signal and the target operating frequency of the touch screen satisfy the predetermined first corresponding relationship. The target operating frequency of the stylus is determined according to the predetermined first corresponding relationship and the frequency of the search signal if the frequency of the search signal and the target operating frequency of the touch screen satisfy the predetermined first corresponding relationship.

The predetermined first corresponding relationship may be any determined mapping relationship. For example, $y=N*x$. y denotes the target operating frequency of the touch screen, x denotes the frequency of the search signal, and N denotes any fixed value. When the frequency of the search signal and the target operating frequency of the touch screen satisfy the predetermined first corresponding relationship, the stylus may be enabled to determine the target operating frequency of the stylus according to the fixed value N and the frequency x of the search signal.

Specifically, step S2 specifically includes: enabling the stylus to determine the frequency of the search signal as the target operating frequency of the stylus if the frequency of the search signal is equal to the target operating frequency of the touch screen. In this way, the calculation operation of the stylus may be effectively simplified.

In this embodiment, the touch screen sends a corresponding response signal to the stylus according to the judgment result, and the response signal is acquired via modulation according to the target operating frequency of the touch screen.

In this embodiment, upon receiving the response signal sent by the touch screen, the stylus considers that the frequency of the search signal and the target operating frequency of the touch screen satisfy the predetermined first corresponding relationship, and thus determines the target operating frequency of the stylus according to the predetermined first corresponding relationship and the frequency of the search signal. As compared with the related art, the complicated operation of manually setting the target operating frequency of the stylus is not needed, which overcome the defect that reception and demodulation of the target operating frequency may not be achieved when a sender and a receiver use different operating frequencies during an orthogonal demodulation.

Figure 5:
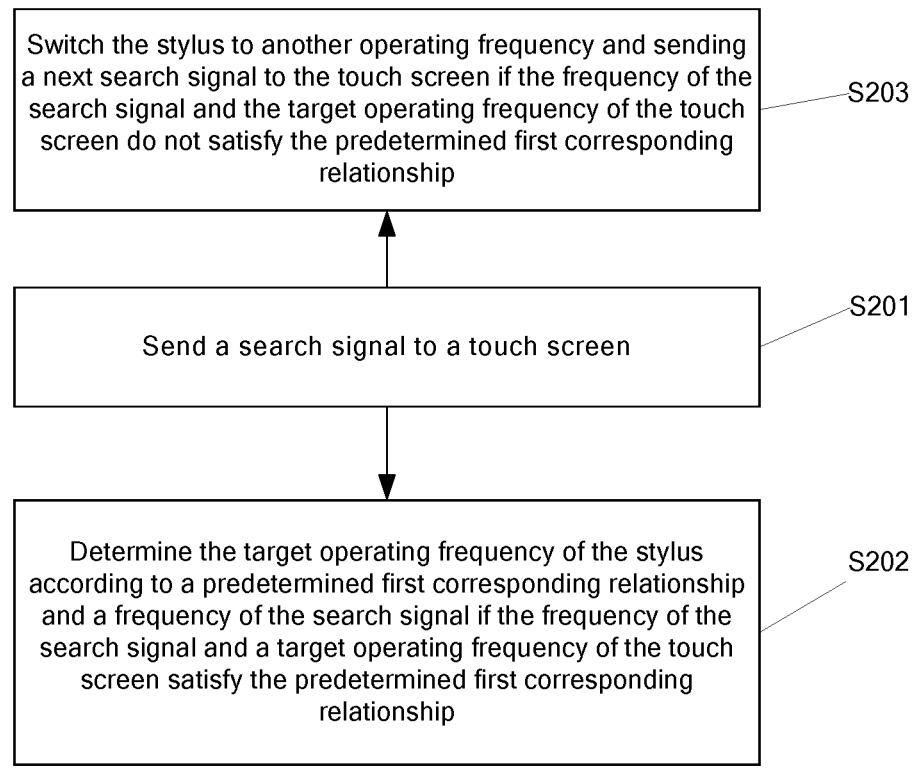
FIG. 5 is a schematic flowchart of a method for determining a target operating frequency of a stylus according to yet still another embodiment of the present application.

Referring to FIG. 5, another embodiment of the present application provides a method for determining a target operating frequency of a stylus, applied to the stylus. The method further includes:

S203: switching the stylus to another operating frequency and sending a next search signal to the touch screen if the frequency of the search signal and the target operating frequency of the touch screen do not satisfy the predetermined first corresponding relationship.

In this embodiment, when the frequency of the search signal sent by the stylus is not equal to the target operating frequency of the touch screen, the stylus switches the operating frequency thereof to a next operating frequency. Then, the stylus generates a corresponding pulse signal again according to the current operating frequency of the stylus, that is, the search signal. The frequency of the search signal is obtained again via modulation according to the current operating frequency of the stylus, and then the stylus sends the corresponding search signal to the touch screen again. The touch screen receives the search signal and detects the frequency of the search signal. Subsequently, the touch screen judges whether the frequency of the search signal and the target operating frequency of the touch screen satisfy the predetermined first corresponding relationship. The target operating frequency of the stylus is determined according to a predetermined first corresponding relationship and the frequency of the search signal, if such steps are repeated until the frequency of the search signal and the target operating frequency of the touch screen satisfy the predetermined first corresponding relationship.

The stylus may set a frequency switching range according to a set of all available operating frequencies that may be used for the touch screen; or may firstly detect noise information on the touch screen, then determine a frequency set of operating frequencies that may be selected as the target operating frequency of the touch screen and finally set a frequency switching range according to the frequency set. Assuming that the frequency switching range of the stylus is [f1, fn], and fi is any one frequency in this frequency range. S(fi) denotes a search signal generated according to fi, and when the frequency of the search signal S(fi) and the target operating frequency of the touch screen do not satisfy the predetermined first corresponding relationship, the stylus switches the operating frequency thereof to fi+1, and generates a search signal S(fi+1).

Switching the operating frequency of the stylus may be practiced by means of hopping, and the hopping may be practiced in a plurality of manners. In this embodiment, the hopping is practiced using a hopping function, and the hopping function herein is defined to be fi+1=next(fi). fi denotes a frequency at which the stylus sends a signal when searching the target operating frequency at the ith time. fi+1 denotes a frequency at which the stylus sends a signal when searching the target operating frequency at the i+1th time. next denotes a hopping algorithm function, and defines rules for hopping from f1 to fi+1.

In this embodiment, switching of the current operating frequency of the stylus is practiced by means of hopping, and thus the target operating frequency of the stylus is determined. In this embodiment, the operating frequency of the stylus may be quickly and automatically switched to the target operating frequency of the touch screen, which gives convenient for users in use. Further, in this embodiment, communication efficiency between the stylus and the touch screen is improved, and the stylus may be used at different frequencies on the touch screens.

Still another embodiment of the present application provides a method for determining a target operating frequency of a stylus, applied to the stylus. Step S202 includes:

receiving a response signal sent by the touch screen, and determining the target operating frequency of the stylus according to the predetermined first corresponding relationship and the frequency of the search signal if the frequency of the search signal and the target operating frequency of the touch screen satisfy the predetermined first corresponding relationship.

During determination of the target operating frequency of the stylus, for further simplifying the communication between the touch screen and the stylus, in this embodiment, the touch screen sends the response signal to the stylus to determine the target operating frequency of the stylus. Specifically, if the frequency of the search signal and the target operating frequency of the touch screen satisfy the predetermined first corresponding relationship, the touch screen sends the response signal to the stylus to enable the stylus to determine the current operating frequency as the target operating frequency. Otherwise, the touch screen does not send a response signal to the stylus, but waits for receiving a next search signal sent by the stylus.

Figure 7:
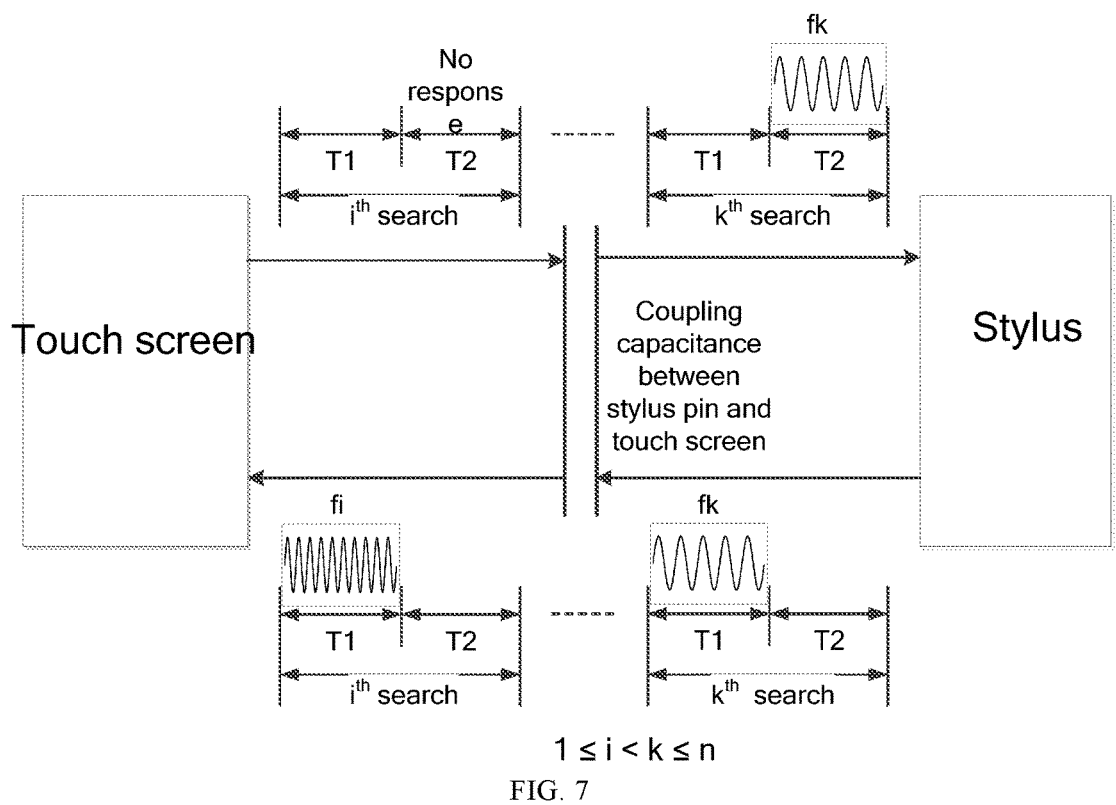
FIG. 7 is a schematic principle diagram of searching a target operating frequency according to some embodiments of the present application.

Specifically, referring to FIG. 7, in this embodiment, assuming that fi is the frequency at which the stylus sends the search signal at the ith time, and fk is the frequency at which the stylus sends the search signal at the kth time.

In the ith search, within a time segment T1, the stylus sends a search signal with a frequency of fi to the touch screen. Meanwhile, the touch screen receives the search signal and detects the frequency of the search signal within the time segment T1. Afterwards, the touch screen detects that the frequency of the search signal and the target operating frequency of the touch screen do not satisfy the predetermined first corresponding relationship, and within a time segment T2, the touch screen makes no response to the current search signal (does not send any signal in response to the search signal). The stylus receives the signal sent by the touch screen within the time segment T2. If the stylus fails to detect the response signal sent by the touch screen, at the expiration of the time segment T2, the stylus switches to another operating frequency by means of hopping, modulates the frequency of the i+1th search signal to fi+1, and starts the i+1th search until the kth search. If it is detected that the frequency of the search signal and the target operating frequency satisfy the predetermined first corresponding relationship, within the time segment T2, the touch screen sends the response signal to the stylus. Within the time segment T2, the stylus receives the response signal sent by the touch screen, and at the expiration of the time segment T2; sets a flag bit, which indicates that the target operating frequency has been searched out and the search is terminated; and sets the target operating frequency of the stylus determined according to the predetermined first corresponding relationship and fk as the operating frequency.

In this embodiment, the response signal is sent to notify the stylus that the operating frequency of the stylus when sending the response signal and the target operating frequency of the touch screen satisfy the predetermined first corresponding relationship, which thereby simplifies communication between the touch screen and the stylus.

Figure 6:
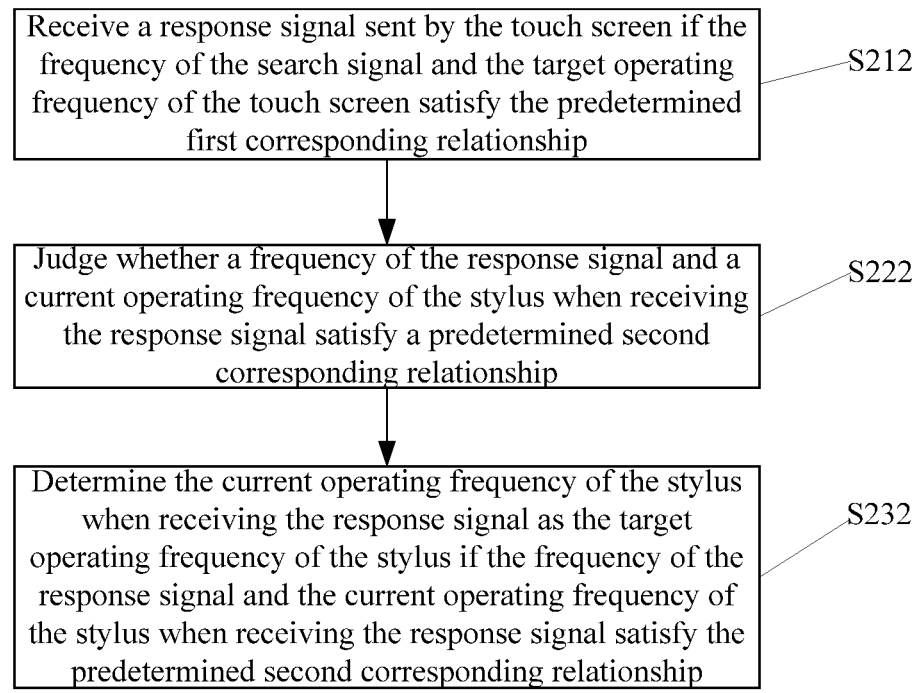
FIG. 6 is a schematic flowchart of a method for determining a target operating frequency of a stylus according to yet still another embodiment of the present application.

Still another embodiment of the present application provides a method for determining a target operating frequency of a stylus, applied to the stylus. Referring to FIG. 6, step S202 includes:

S212: receiving a response signal sent by the touch screen if the frequency of the search signal and the target operating frequency of the touch screen satisfy the predetermined first corresponding relationship;

S222: judging whether a frequency of the response signal and a current operating frequency of the stylus when receiving the response signal satisfy a predetermined second corresponding relationship; and S232: determining the target operating frequency of the stylus according to the predetermined first corresponding relationship and the frequency of the search signal if the frequency of the response signal and the current operating frequency of the stylus when receiving the response signal satisfy the predetermined second corresponding relationship.

As described in the above embodiments, the predetermined first corresponding relationship is that the frequency of the search signal is equal to the target operating frequency of the touch screen, and the frequency of the search signal is the current operating frequency of the stylus, which effectively simplifies the calculation operation of the stylus. However, during the course of sending the search signal and receiving the response signal by the stylus, if the current operating frequency of the stylus is changed, determination of the target operating frequency of the stylus may be subject to a problem. In this implementation manner, based on the relationship that the current operating frequency of the stylus when sending the search signal is equal to the frequency of the search signal, and the predetermined first corresponding relationship indicating that the frequency of the search signal is equal to the target operating frequency of the touch screen, and the corresponding relationship between the response signal and the target operating frequency of the touch screen, it may be known that the current operating frequency at when the stylus sends the search signal and the frequency of the response signal satisfy the predetermined second corresponding relationship. Therefore, whether the current operating frequency of the stylus is changed during the source of sending the search signal and receiving the response signal is determined by judging whether the frequency of the response signal and the current operating frequency of the stylus satisfy the predetermined second corresponding relationship when receiving the response signal.

Specifically, referring to FIG. 7, in this embodiment, assuming that fi is the operating frequency at which the stylus searches the target operating frequency at the ith time, and fk is the operating frequency at which the stylus searches the target operating frequency at the kth time.

In the ith search, within a time segment T1, the stylus sends a search signal with a frequency of fi to the touch screen. Meanwhile, the touch screen receives the search signal and detects the frequency of the search signal within the time segment T1. Afterwards, the touch screen detects that the frequency of the search signal and the target operating frequency of the touch screen do not satisfy the predetermined first corresponding relationship, and within a time segment T2, the touch screen makes no response to the current search signal (does not send any signal in response to the search signal). The stylus detects whether the touch screen sends the response signal within the time segment T2, and at the expiration of the second time segment T2, judges whether the response signal is detected. If the stylus fails to detect the response signal, at the expiration of the time segment T2, the stylus switches to another operating frequency by means of hopping, sets the frequency of the i+1th search signal to fi+1, and starts the i+1th search until the kth search. If it is detected that the frequency of the search signal and the target operating frequency satisfy the predetermined first corresponding relationship, within the time segment T2, the touch screen sends the response signal to the stylus. Within the time segment T2, the stylus receives the response signal sent by the touch screen, and at the expiration of the time segment T2; sets a flag bit, which indicates that the target operating frequency has been searched out and the search is terminated; and sets the target operating frequency of the stylus determined according to the predetermined first corresponding relationship and fk as the operating frequency.

In this embodiment, the response signal is sent to notify the stylus that the operating frequency of the stylus when sending the response signal and the target operating frequency of the touch screen satisfy the predetermined first corresponding relationship, which thereby simplifies communication between the touch screen and the stylus.

In this embodiment, after the response signal is sent to notify the stylus that the frequency of the search signal of the stylus and the target operating frequency of the touch screen satisfy the predetermined first corresponding relationship, whether the operating frequency of the stylus when receiving the response signal and the frequency of the response signal satisfy the predetermined second corresponding relationship is further judged, such that a judgment is made on whether the current operating frequency of the stylus is equal to the target operating frequency of the touch screen. In this embodiment, the structure that originally operates normally in the circuit may be multiplexed, without configuring other signal receiver, thereby saving the hardware. In addition, in this embodiment, another judgment on whether the current operating frequency of the stylus is equal to the target operating frequency of the touch screen is made on the side of the stylus via the response signal, and the current operating frequency of the stylus may be prevented from changing in this process.

Figure 8:
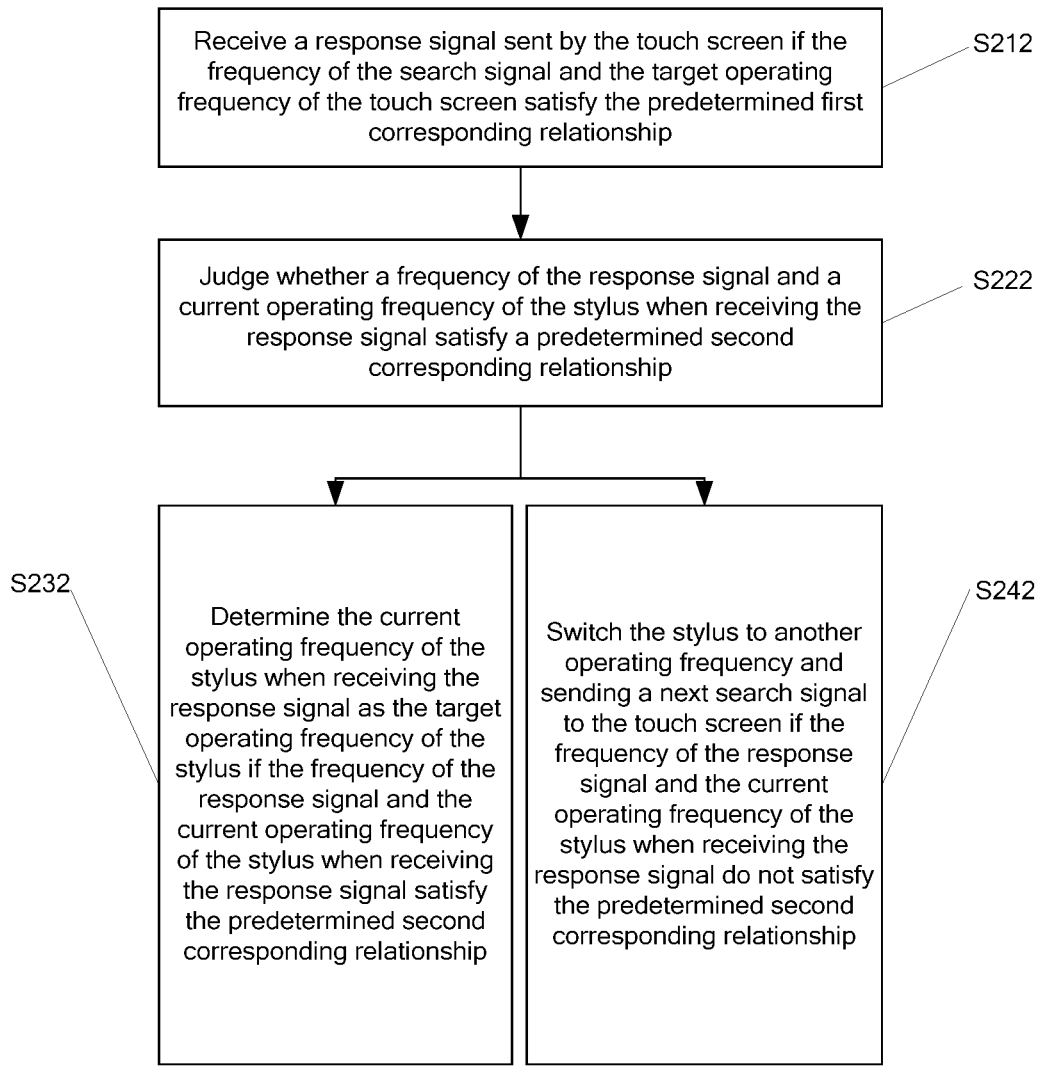
FIG. 8 is a schematic flowchart of a method for determining a target operating frequency of a stylus according to yet still another embodiment of the present application.

Referring to FIG. 8, in this embodiment, step S202 further includes:

S242: switching the stylus to another operating frequency and sending a next search signal to the touch screen if the frequency of the response signal and the target operating frequency of the stylus when receiving the response signal do not satisfy the predetermined second corresponding relationship.

Specifically, referring to FIG. 7, in this embodiment, assuming that fi is the operating frequency at which the stylus searches the target operating frequency at the ith time, and fk is the operating frequency at which the stylus searches the target operating frequency at the kth time.

In the ith search, within a time segment T1, the stylus sends a search signal with a frequency of fi to the touch screen. Meanwhile, the touch screen receives the search signal and detects the frequency of the search signal within the time segment T1. Afterwards, the touch screen detects that the frequency of the search signal and the target operating frequency of the touch screen do not satisfy the predetermined first corresponding relationship, and within a time segment T2, the touch screen makes no response to the current search signal (does not send any signal in response to the search signal). The stylus detects whether the touch screen sends the response signal within the time segment T2, and at the expiration of the second time segment T2, judges whether the response signal is detected. If the stylus fails to detect the response signal, at the expiration of the time segment T2, the stylus switches to another operating frequency by means of hopping, sets the frequency of the i+1th search signal to fi+1, and starts the i+1th search until the kth search. If it is detected that the frequency of the search signal and the target operating frequency satisfy the predetermined first corresponding relationship, within the time segment T2, the touch screen sends the response signal to the stylus. Within the time segment T2, the stylus receives the response signal sent by the touch screen, and at the expiration of the time segment T2; sets a flag bit, which indicates that the target operating frequency has been searched out and the search is terminated; and sets the target operating frequency of the stylus determined according to the predetermined first corresponding relationship and fk as the operating frequency.

In this embodiment, the response signal is sent to notify the stylus that the operating frequency of the stylus when sending the response signal and the target operating frequency of the touch screen satisfy the predetermined first corresponding relationship, which thereby simplifies communication between the touch screen and the stylus.

In this embodiment, after the response signal is sent to notify the stylus that the frequency of the search signal of the stylus and the target operating frequency of the touch screen satisfy the predetermined first corresponding relationship, whether the operating frequency of the stylus when receiving the response signal and the frequency of the response signal satisfy the predetermined second corresponding relationship is further judged, such that a judgment is made on whether the current operating frequency of the stylus is equal to the target operating frequency of the touch screen. In this embodiment, the structure that originally operates normally in the circuit may be multiplexed, without configuring other signal receiver, thereby saving the hardware. In addition, in this embodiment, another judgment on whether the current operating frequency of the stylus is equal to the target operating frequency of the touch screen is made on the side of the stylus via the response signal, and the current operating frequency of the stylus may be prevented from changing in this process.

It should be noted that in another embodiment of the present disclosure, the frequency of the search signal may be set to be equal to the target operating frequency of the touch screen. As such, the frequency of the response signal, the current operating frequency of the stylus when sending the search signal and the frequency of the response signal are equal to each other. If the current operating frequency of the stylus is not changed during the course of sending the search signal and receiving the response signal, the current operating frequency of the stylus when receiving the response signal is also equal to the frequency of the response signal. For further reduction of the errors produced in the course of determining the target operating frequency of the stylus, an orthogonal demodulation method may be employed to judge whether the current operating frequency of the stylus when receiving the response signal is equal to the frequency of the response signal.

Figure 9:
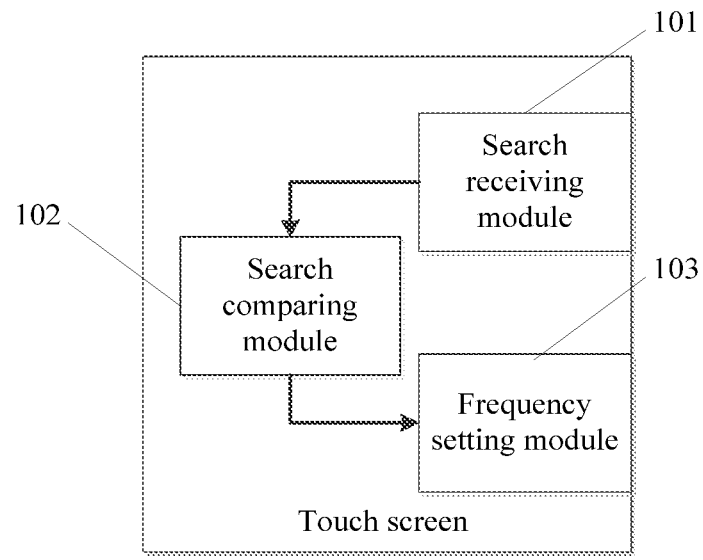
FIG. 9 is a schematic structural diagram of a touch screen according to one embodiment the present application.

Referring to FIG. 9, an embodiment of the present application provides a touch screen. The touch screen includes:

a search receiving module 101, configured to receive a search signal sent by a stylus, and detect a frequency of the search signal;

a search comparing module 102, configured to judge whether the frequency of the search signal and a target operating frequency of the touch screen satisfy a predetermined first corresponding relationship; and a frequency setting module 103, configured to enable the stylus to determine the target operating frequency of the stylus according to the predetermined first corresponding relationship and the frequency of the search signal if the frequency of the search signal and the target operating frequency of the touch screen satisfy the predetermined first corresponding relationship.

When the touch screen operates in cooperation with the stylus, frame synchronization needs to be ensured between the stylus and the touch screen. That is, the stylus and the touch screen need to operate at the same frequency, to ensure that the touch screen accurately acquires touch information from the stylus. To ensure that the stylus and the touch screen operate at the same frequency, in this embodiment, a search comparing module 102 is set on the touch screen, and is configured to judge whether the frequency of the search signal and the target operating frequency of the touch screen satisfy the predetermined first corresponding relationship.

Specifically, the stylus may be firstly enabled to generate a corresponding pulse signal according to the current operating frequency of the stylus, that is, the search signal; and then the stylus sends the corresponding search signal to the touch screen. The search receiving module 101 of the touch screen receives the search signal, and counts the number of pulses per second in the search signal to acquire the frequency of the search signal. The search receiving module 101 judges whether the frequency of the search signal and the target operating frequency of the touch screen satisfy the predetermined first corresponding relationship, to obtain a judgment result. If it is judged that the frequency of the search signal and the target operating frequency of the touch screen satisfy the predetermined first corresponding relationship, the frequency setting module 103 enables the stylus to obtain via calculation the target operating frequency of the touch screen according to the predetermined first corresponding relationship and the frequency of the search signal, and determine the target operating frequency of the touch screen as the target operating frequency of the stylus.

The predetermined first corresponding relationship may be any determined mapping relationship. For example, $y=N*x$. y denotes the target operating frequency of the touch screen, x denotes the frequency of the search signal, and N denotes any fixed value. When the frequency of the search signal and the target operating frequency of the touch screen satisfy the predetermined first corresponding relationship, the stylus may be enabled to determine the target operating frequency of the stylus according to the fixed value N and the frequency x of the search signal.

Specifically, step S2 specifically includes: enabling the stylus to determine the frequency of the search signal as the target operating frequency of the stylus if the frequency of the search signal is equal to the target operating frequency of the touch screen. In this way, the calculation operation of the stylus may be effectively simplified.

In this embodiment, the touch screen sends a corresponding response signal to the stylus according to the judgment result, and the response signal is acquired via modulation according to the target operating frequency of the touch screen. In this embodiment, the frequency setting module 103 of the touch screen sends the corresponding response signal to the stylus according to the judgment result. That is, a response signal is sent to the stylus, and the stylus is enabled to determine the target operating frequency of the stylus according to the predetermined first corresponding relationship and the frequency of the search signal if the judgment result indicates that the frequency of the search signal and the target operating frequency of the touch screen satisfy the predetermined first corresponding relationship. The response signal is sent to trigger the stylus to determine the target operating frequency of the stylus according to the predetermined first corresponding relationship and the frequency of the search signal, which simplifies the communication process between the touch screen and the stylus.

In addition, a person skilled in the art would also trigger in other manners the stylus to determine the target operating frequency of the stylus according to the predetermined first corresponding relationship and the frequency of the search signal. For example, a flag bit is set in the touch screen, and the stylus acquires a flag bit state whereupon the stylus is triggered to determine the target operating frequency of the stylus according to the predetermined first corresponding relationship and the frequency of the search signal.

In this embodiment, if the target operating frequency of the touch screen and the frequency of the search signal sent by the stylus satisfy the predetermined first corresponding relationship, the stylus may be enabled to acquire the target operating frequency of the touch screen, and determine the current operating frequency of the touch screen as the target operating frequency of the stylus. As compared with the related art, the complicated operation of manually setting the target operating frequency of the stylus is not needed, which overcome the defect that reception and demodulation of the target operating frequency may not be achieved when a sender and a receiver use different operating frequencies during an orthogonal demodulation.

Figure 10:
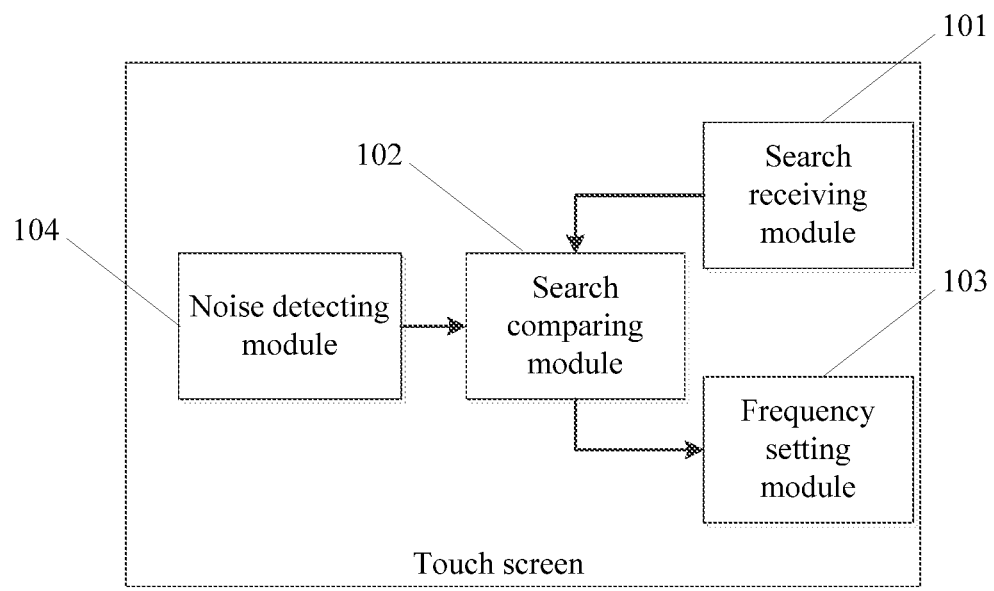
FIG. 10 is a schematic structural diagram of a touch screen according to another embodiment the present application.

Referring to FIG. 10, in another embodiment of the present application, the touch screen further includes: a noise detecting module 104, configured to detect noise information of the touch screen, and determine the target operating frequency of the touch screen according to the noise information.

When the touch screen operates in cooperation with the stylus to complete the touch operation, if great noise is present in the operating environment of the stylus and the touch screen, for example, LCD noise of the touch screen, and the frequency of the noise is equal to the target operating frequency of the touch screen and the stylus, normal operations of the touch screen and the stylus may be affected. For example, the touch screen may not correctly acquire touch information of the stylus. Therefore, noise monitoring needs to be carried out by the noise detecting module 104 of the touch screen to avoid frequency points with great noise, and select a frequency with less noise as the target operating frequency of the touch screen.

Specifically, referring to FIG. 3, FIG. 3 is a noise distribution map of a noise detecting module according to an embodiment. In this embodiment, before the touch screen receives the search signal sent by the stylus, the noise detecting module 104 detects noise information on the touch screen to acquire noise information on the touch screen. Frequency points f1, f2, fi, fk+1 and fn on the touch screen are all subject to great noise, and thus need to be avoided in use. Frequency point fk is subject to less noise, and thus frequency fk may be selected as the target operating frequency. Frequency fk is selected as the target operating frequency of the touch screen, such that the stylus operates at the target operating frequency. As such, convenience is brought to users, and reliability of communication between the stylus and the terminal of the touch screen is improved.

Referring to FIG. 10, in still another embodiment of the present application, the noise detecting module 104 is specifically configured to:

detect a noise strength of the touch screen at each frequency, and set a frequency with the noise strength lower than a predetermined strength threshold among the detected noise strengths as the target operating frequency of the touch screen.

The noise detecting module 104 is further specifically configured to:

detect the noise strengths of the touch screen at the each frequency, and select a frequency which the hopping of the stylus most quickly reach as the target operating frequency of the touch screen if there is more than one frequency at which the noise strength is lower than the predetermined noise threshold.

The specific process in this embodiment is similar to that in Embodiment 4, which is thus not described herein any further. In this embodiment, the frequency with the least noise is set as the target operating frequency, such that reliability of communication between the stylus and the terminal of the touch screen is further improved.

Referring to FIG. 10, in still another embodiment of the present application, the noise detecting module 104 is specifically configured to:

detect a noise strength of the touch screen at each frequency, and set a frequency with a minimum noise strength among the detected noise strengths as the target operating frequency of the touch screen.

The noise detecting module 104 is further specifically configured to:

detect the noise strengths of the touch screen at each frequency, and select a frequency which the hopping of the stylus most quickly reaches as the target operating frequency of the touch screen if there is more than one frequency at which the noise strength the minimum.

In this embodiment, a noise strength threshold needs to be defaulted, and then the frequency at which the noise strength is lower than the noise strength threshold is selected from each frequency as the target operating frequency. Nevertheless, there may be more than one frequency at which the noise strength is lower than the noise strength threshold. The processing method is similar to that described in the above embodiment, which is thus not described herein any further. In this embodiment, setting a threshold may simplify the steps of determining the target operating frequency, improve communication efficiency between the stylus and the terminal of the touch screen, and accelerates determination of the target operating frequency.

The definition of the noise strength in any of the above embodiments needs to be clarified herein. The noise is converted into a corresponding electrical signal, and some parameters of the noise electrical signal are used as indicators for characterizing the noise strength, for example, voltage, energy, variance, power and the like.

Referring to FIG. 9, in still another embodiment of the present application, the frequency setting module 103 is specifically configured to:

send a response signal to the stylus, and enable the stylus to determine the target operating frequency of the stylus according to the predetermined first corresponding relationship and the frequency of the search signal if the frequency of the search signal and the target operating frequency of the touch screen satisfy the predetermined first corresponding relationship.

During determination of the target operating frequency of the stylus, in this embodiment, the frequency setting module 103 of the touch screen sends the response signal to the stylus to determine the target operating frequency of the stylus. For further simplification of the communication between the touch screen and the stylus, whether the frequency of the search signal and the target operating frequency of the touch screen satisfy the predetermined first corresponding relationship is judged based on the response signal. Specifically, if the frequency of the search signal and the target operating frequency of the touch screen satisfy the predetermined first corresponding relationship, the frequency setting module 103 of the touch screen sends a signal to the stylus, whereupon the stylus determines the target operating frequency of the stylus according to the predetermined first corresponding relationship and the frequency of the search signal. Otherwise, the touch screen does not send a signal to the stylus, but waits for receiving a next search signal sent by the stylus.

Figure 11:
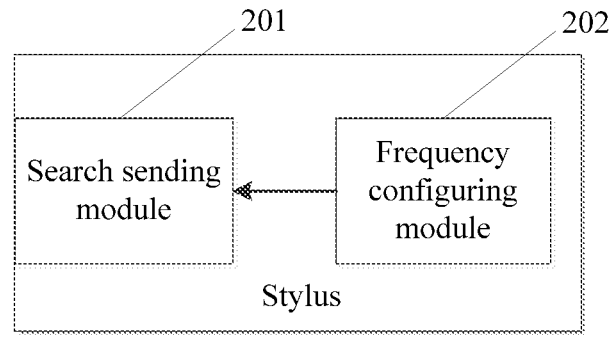
FIG. 11 is a schematic structural diagram of a stylus according to one embodiment the present application.

Referring to FIG. 11, one embodiment of the present application provides a stylus. The stylus includes:

a search sending module 201, configured to send a search signal to a touch screen; and a frequency configuring module 202, configured to determine the target operating frequency of the stylus according to a predetermined first corresponding relationship and a frequency of the search signal if the frequency of the search signal and a target operating frequency of the touch screen satisfy the predetermined first corresponding relationship.

When the stylus operates in cooperation with the touch screen, frame synchronization needs to be ensured between the stylus and the touch screen. That is, the stylus and the touch screen need to operate at the same frequency, to ensure that the stylus accurately sends touch information to the touch screen. To ensure that the stylus and the touch screen need to operate at the same frequency, this embodiment discloses determining the target operating frequency of the stylus on the side of the stylus.

Specifically, the stylus generates, by using the search sending module 201, a corresponding pulse signal according to the current operating frequency of the stylus, that is, the search signal. The frequency of the search signal is obtained via modulation according to the current operating frequency of the stylus, and then the stylus sends the corresponding search signal to the touch screen. The touch screen receives the search signal and detects the frequency of the search signal. The touch screen acquires the judgment result of the frequency and the target operating frequency of the touch screen. The frequency configuring module 202 determines the target operating frequency of the stylus according to the predetermined first corresponding relationship and the frequency of the search signal if the frequency of the search signal and the target operating frequency of the touch screen satisfy the predetermined first corresponding relationship.

The predetermined first corresponding relationship may be any determined mapping relationship. For example, y=N*x. y denotes the target operating frequency of the touch screen, x denotes the frequency of the search signal, and N denotes any fixed value. When the frequency of the search signal and the target operating frequency of the touch screen satisfy the predetermined first corresponding relationship, the stylus may be enabled to determine the target operating frequency of the stylus according to the fixed value N and the frequency x of the search signal.

Specifically, step S2 specifically includes: enabling the stylus to determine the frequency of the search signal as the target operating frequency of the stylus if the frequency of the search signal is equal to the target operating frequency of the touch screen. In this way, the calculation operation of the stylus may be effectively simplified.

In this embodiment, the touch screen sends a corresponding response signal to the stylus according to the judgment result, and the response signal is acquired via modulation according to the target operating frequency of the touch screen. In this embodiment, the frequency configuring module 202 of the stylus receives the corresponding response signal sent by the touch screen according to the judgment result. That is, the stylus receives the response signal, and the stylus is enabled to determine the target operating frequency of the stylus according to the predetermined first corresponding relationship and the frequency of the search signal if the judgment result indicates that the frequency of the search signal and the target operating frequency of the touch screen satisfy the predetermined first corresponding relationship. In this embodiment, it is determined based on the response signal that the current operating frequency of the stylus is the target operating frequency of the stylus, which simplifies the communication process between the touch screen and the stylus.

In addition, a person skilled in the art would also trigger in other manners the stylus to determine the target operating frequency of the stylus according to the predetermined first corresponding relationship and the frequency of the search signal. For example, a flag bit is set in the touch screen, and the stylus acquires a flag bit state whereupon the stylus is triggered to determine the target operating frequency of the stylus according to the predetermined first corresponding relationship and the frequency of the search signal.

In this embodiment, upon receiving the response signal sent by the touch screen, the stylus considers that the frequency of the search signal and the target operating frequency of the touch screen satisfy the predetermined first corresponding relationship, and thus the frequency configuring module 202 determines the target operating frequency of the stylus according to the predetermined first corresponding relationship and the frequency of the search signal. As compared with the related art, in this embodiment, the complicated operation of manually setting the target operating frequency of the stylus is not needed, which overcome the defect that reception and demodulation of the target operating frequency may not be achieved when a sender and a receiver use different operating frequencies during an orthogonal demodulation. In addition, in this embodiment, the stylus may all be used on different touch screens.

Figure 12:
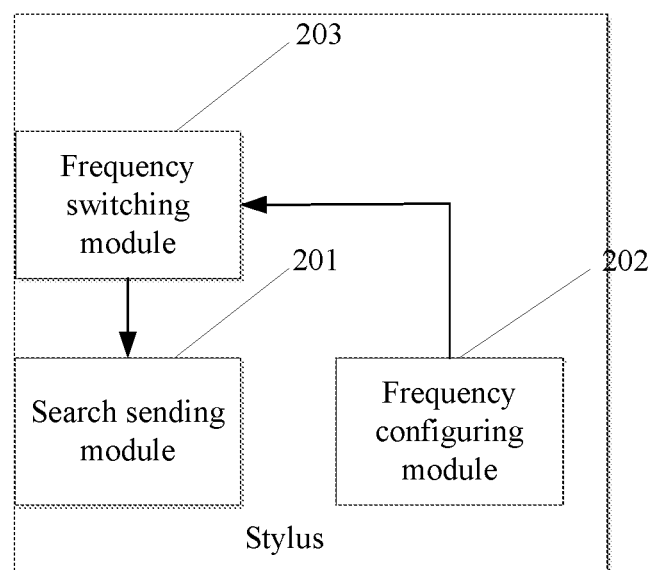
FIG. 12 is a schematic structural diagram of a stylus according to another embodiment the present application.

Referring to FIG. 12, in another embodiment of the present application, the stylus further includes:

a frequency switching module 203, configured to switch the stylus to another operating frequency and send a next search signal to the touch screen if the frequency of the search signal and the target operating frequency of the touch screen do not satisfy the predetermined first corresponding relationship.

In this embodiment, when the frequency of the search signal sent by the stylus is not equal to the target operating frequency of the touch screen, the stylus switches the operating frequency thereof to a next operating frequency via the frequency switching module 203. Afterwards, the stylus performs coding and generates a corresponding pulse signal according to the current operating frequency of the stylus, that is, the search signal; and then the stylus sends the corresponding search signal to the touch screen. The touch screen receives the search signal and detects the frequency of the search signal. Subsequently, the touch screen judges again whether the frequency of the search signal and the target operating frequency of the touch screen satisfy the predetermined first corresponding relationship. The target operating frequency of the stylus is determined according to the predetermined first corresponding relationship and the frequency of the search signal, if such steps are repeated until the frequency of the search signal and the target operating frequency of the touch screen satisfy the predetermined first corresponding relationship.

The stylus may set a frequency switching range according to a set of all available operating frequencies that may be used for the touch screen; or may firstly detect noise information on the touch screen, then determine a frequency set of operating frequencies that may be selected as the target operating frequency of the touch screen and finally set a frequency switching range according to the frequency set. Assuming that the frequency switching range of the stylus is [f1, fn], and fi is any one frequency in this frequency switching range. S(fi) denotes a search signal generated according to fi, and when the frequency of the search signal S(fi) and the target operating frequency of the touch screen do not satisfy the predetermined first corresponding relationship, the stylus switches the operating frequency thereof to fi+1 via the frequency switching frequency 203, and generates a search signal S(fi+1).

Switching the operating frequency by the frequency switching module 203 may be practiced by means of hopping, and the hopping may be practiced in a plurality of manners. In this embodiment, the hopping is practiced using a hopping function, and the hopping function herein is defined to be fi+1=next(fi). fi denotes a frequency at which the stylus sends a signal when searching the target operating frequency at the ith time. fi+1 denotes a frequency at which the stylus sends a signal when searching the target operating frequency at the i+1th time. next denotes a hopping algorithm function, and defines rules for hopping from f1 to fi+1.

In this embodiment, the stylus is switched to another operating frequency by means of the frequency switching module 203, such that the current operating frequency of the stylus is changed. As such, the target operating frequency of the stylus is determined. In this embodiment, the operating frequency of the stylus may be quickly and automatically switched to the target operating frequency of the touch screen. Further, in this embodiment, communication efficiency between the stylus and the touch screen is improved, and the stylus may be used on touch screens at different frequencies.

In still another embodiment of the present application, the frequency configuring module 202 is specifically configured to:

receive a response signal sent by the touch screen, and determine the target operating frequency of the stylus according to the predetermined first corresponding relationship and the frequency of the search signal if the frequency of the search signal and the target operating frequency of the touch screen satisfy the predetermined first corresponding relationship. During determination of the target operating frequency of the stylus, for further simplifying the communication between the touch screen and the stylus, in this embodiment, the touch screen sends the response signal to the stylus to determine the target operating frequency of the stylus. Specifically, if the frequency of the search signal and the target operating frequency of the touch screen satisfy the predetermined first corresponding relationship, the touch screen sends the response signal to the stylus to enable the stylus to determine the current operating frequency as the target operating frequency. Otherwise, the touch screen does not send the response signal to the stylus, but waits for receiving a next search signal sent by the stylus.

Specifically, referring to FIG. 7, in this embodiment, assuming that fi is the frequency at which the stylus sends the search signal at the ith time, and fk is the frequency at which the stylus sends the search signal at the kth time.

In the ith search, within a time segment T1, the stylus sends, via the search sending module 201, a search signal with a frequency of fi to the touch screen. Meanwhile, the touch screen receives the search signal and detects the frequency of the search signal within the time segment T1. Afterwards, the touch screen detects that the frequency of the search signal and the target operating frequency of the touch screen do not satisfy the predetermined first corresponding relationship, and within a time segment T2, the touch screen makes no response to the current search signal (does not send any signal in response to the search signal). The stylus receives the signal sent by the touch screen within the time segment T2. If the signal receiving module 212 fails to detect the response signal sent by the touch screen, at the expiration of the time segment T2, the stylus switches to another operating frequency by means of hopping, modulates the frequency of the i+1th search signal to fi+1, and starts the i+1th search until the kth search. If it is detected that the frequency of the search signal and the target operating frequency satisfy the predetermined first corresponding relationship, within the time segment T2, the touch screen sends the response signal to the stylus. Within the time segment T2, the stylus receives the response signal sent by the touch screen, and at the expiration of the time segment T2; sets a flag bit, which indicates that the target operating frequency has been searched out and the search is terminated; and sets the target operating frequency of the stylus determined according to the predetermined first corresponding relationship and fk as the operating frequency.

In this embodiment, the response signal is sent to notify the stylus that the operating frequency at which the stylus sends the response signal and the target operating frequency of the touch screen satisfy the predetermined first corresponding relationship, which thereby simplifies communication between the touch screen and the stylus.

Figure 13:
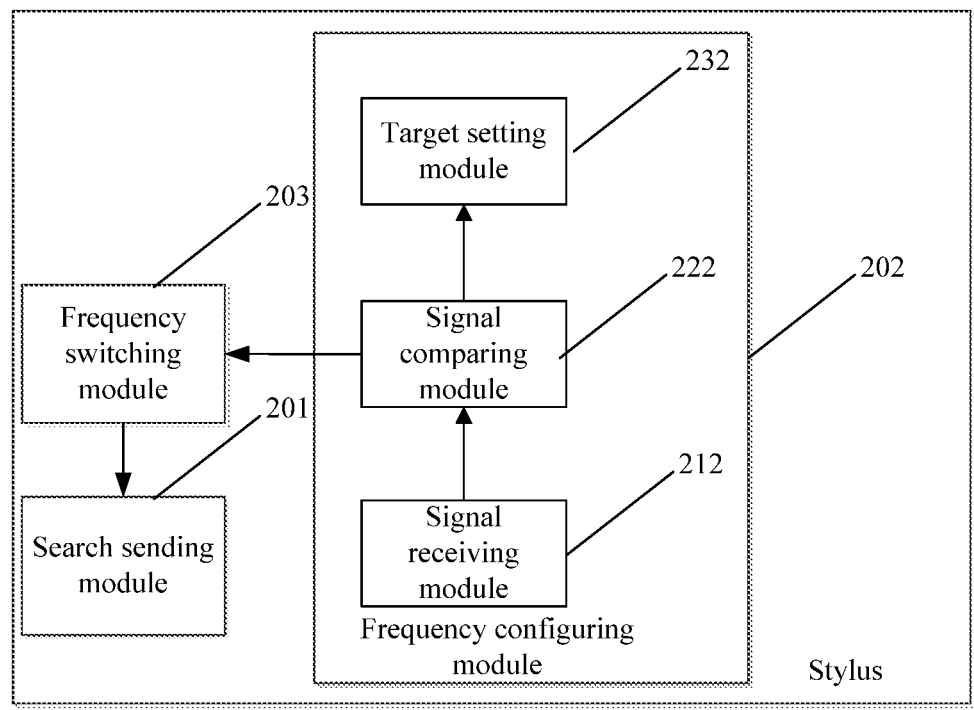
FIG. 13 is a schematic structural diagram of a stylus according to still another embodiment the present application.

Referring to FIG. 13, in still another embodiment of the present application, the frequency setting module 202 includes:

a signal receiving module 212, configured to receive a response signal sent by the touch screen if the frequency of the search signal and the target operating frequency of the touch screen satisfy the predetermined first corresponding relationship;

a signal comparing module 222, configured to judge whether a frequency of the response signal and a current operating frequency of the stylus when receiving the response signal satisfy a predetermined second corresponding relationship; and a target setting module 232, configured to determine the target operating frequency of the stylus according to the predetermined first corresponding relationship and the frequency of the search signal if the frequency of the response signal and the current operating frequency of the stylus when receiving the response signal satisfy the predetermined second corresponding relationship.

As described in the above embodiments, the predetermined first corresponding relationship is that the frequency of the search signal is equal to the target operating frequency of the touch screen, and the frequency of the search signal is the current operating frequency of the stylus, which effectively simplifies the calculation operation of the stylus. However, during the course of sending the search signal and receiving the response signal by the stylus, if the current operating frequency of the stylus is changed, determination of the target operating frequency of the stylus may be subject to a problem. In this implementation manner, based on the relationship that the current operating frequency of the stylus when sending the search signal is equal to the frequency of the search signal, and the predetermined first corresponding relationship indicating that the frequency of the search signal is equal to the target operating frequency of the touch screen, and the corresponding relationship between the response signal and the target operating frequency of the touch screen, it may be known that the current operating frequency at when the stylus sends the search signal and the frequency of the response signal satisfy the predetermined second corresponding relationship. Therefore, whether the current operating frequency of the stylus is changed during the course of sending the search signal and receiving the response signal is determined by judging whether the frequency of the response signal and the current operating frequency of the stylus when receiving the response signal satisfy the predetermined second corresponding relationship.

Specifically, referring to FIG. 7, in this embodiment, assuming that fi is the operating frequency of the stylus when searching the target operating frequency at the ith time, and fk is the operating frequency of the stylus when searching the target operating frequency at the kth time.

In the ith search, within a time segment T1, the stylus sends a search signal with a frequency of fi to the touch screen. Meanwhile, the touch screen receives the search signal and detects the frequency of the search signal within the time segment T1. Afterwards, the touch screen detects that the frequency of the search signal and the target operating frequency of the touch screen do not satisfy the predetermined first corresponding relationship, and within a time segment T2, the touch screen makes no response to the current search signal (does not send any signal in response to the search signal). The touch screen detects whether the touch screen sends the response signal within the time segment T2, and at the expiration of the second time segment T2, judges whether the response signal is detected. If the stylus fails to detect the response signal, at the expiration of the time segment T2, the stylus switches to another operating frequency by means of hopping, sets the frequency of the i+1th search signal to fi+1, and starts the i+1th search until the kth search. If it is detected that the frequency of the search signal and the target operating frequency satisfy the predetermined first corresponding relationship, within the time segment T2, the touch screen sends the response signal to the stylus. Within the time segment T2, the stylus receives the response signal sent by the touch screen, and at the expiration of the time segment T2; sets a flag bit, which indicates that the target operating frequency has been searched out and the search is terminated; and sets the target operating frequency of the stylus determined according to the predetermined first corresponding relationship and fk as the operating frequency.

In this embodiment, the response signal is sent to notify the stylus that the operating frequency of the stylus when sending the response signal and the target operating frequency of the touch screen satisfy the predetermined first corresponding relationship, which thereby simplifies communication between the touch screen and the stylus.

In this embodiment, the signal comparing module 222 is further configured to:

switch the stylus to another operating frequency and send a next search signal to the touch screen if the frequency of the response signal and the current operating frequency of the stylus when receiving the response signal do not satisfy the predetermined second corresponding relationship.

Specifically, referring to FIG. 7, in this embodiment, assuming that fi is the operating frequency of the stylus when searching the target operating frequency at the ith time, and fk is the operating frequency of the stylus when searching the target operating frequency at the kth time.

In the ith search, within a time segment T1, the stylus sends, via the search sending module 201, a search signal with a frequency of fi to the touch screen. Meanwhile, the touch screen receives the search signal and detects the frequency of the search signal within the time segment T1. Afterwards, the touch screen detects that the frequency of the search signal and the target operating frequency of the touch screen do not satisfy the predetermined first corresponding relationship, and within a time segment T2, the touch screen makes no response to the current search signal (does not send any signal in response to the search signal). The stylus detects whether the touch screen sends the response signal within the time segment T2. If the signal receiving module 212 fails to detect the response signal sent by the touch screen, at the expiration of the time segment T2, the stylus switches to another operating frequency by means of hopping, modulates the frequency of the i+1th search signal to fi+1, and starts the i+1th search.

In the kth search, within the time segment T1, the stylus sends, via the signal comparing module 222, a search signal with a frequency of fk to the touch screen. Meanwhile, within the time segment T1, the touch screen receives the search signal and detects the frequency of the search signal, and the stylus detects that the frequency of the search signal and the target operating frequency fk satisfy the predetermined first corresponding relationship. Within the second time segment T2, the touch screen sends a signal with the target operating frequency fk as the frequency as a response. The stylus receives the signal sent by the touch screen and detects the frequency of the signal within the time segment T2 by using the signal receiving module 212. If the stylus detects that the frequency of the touch screen when sending the response signal and the current operating frequency fk of the touch screen do not satisfy the predetermined second corresponding relationship, the stylus switches to another operating frequency and sends a next search signal to the touch screen.

In this embodiment, after the response signal is sent to notify the stylus that the frequency of the search signal of the stylus and the target operating frequency of the touch screen satisfy the predetermined first corresponding relationship, whether the operating frequency of the stylus when receiving the response signal and the frequency of the response signal satisfy the predetermined second corresponding relationship is further judged, such that a judgment is made on whether the current operating frequency of the stylus is equal to the target operating frequency of the touch screen. In this embodiment, the structure that originally operates normally in the circuit may be multiplexed, without configuring other signal transceivers, thereby saving the hardware. In addition, in this embodiment, another judgment on whether the current operating frequency of the stylus is equal to the target operating frequency of the touch screen is made on the side of the stylus via the response signal, and the current operating frequency of the stylus may be prevented from changing in this process.

In any of the above embodiments of the present application, during determination of the target operating frequency of the stylus, the communication between the stylus and the touch screen may be practiced by means of coupling capacitance between the touch screen and the stylus. In addition, a person skilled in the art would also practice the communication between the stylus and the touch screen in other manners, for example, by means of a signal wire between the touch screen and the stylus.

Figure 14:
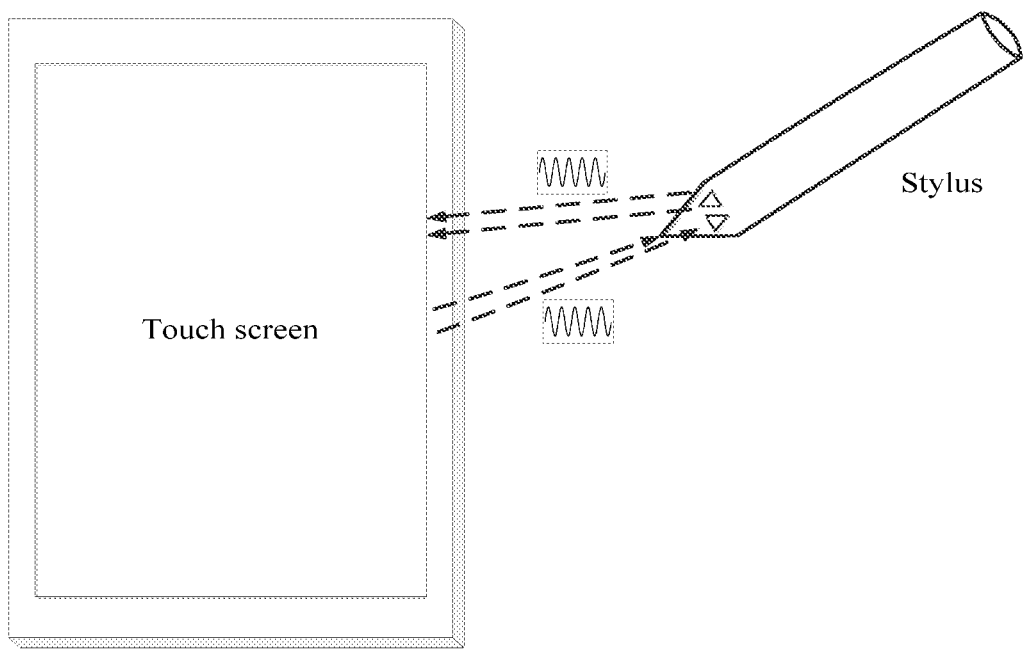
FIG. 14 is a schematic diagram of communication between a stylus and a touch screen via a stylus tip.

In addition, since the stylus tip is very tiny (having a diameter of about 1 mm), referring to FIG. 14, the coupling capacitance between the stylus tip and the touch screen is very small. The coupling capacitance is about 0.05 pf. Therefore, when the touch screen sends a signal to the stylus, generally a plurality of drive circuits (that is, a region) generate signals having the same frequency and the same phase, to enhance the strength of the signal received by the stylus tip.

Figure 15:
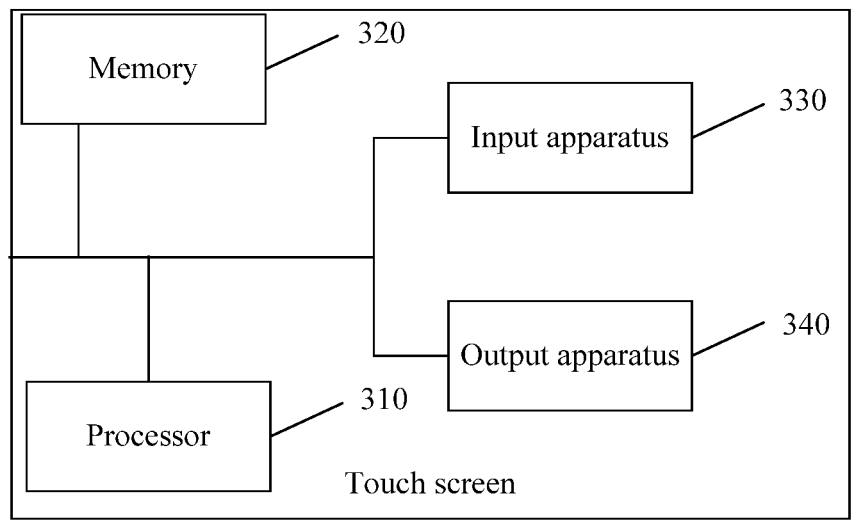
FIG. 15 is a schematic structural diagram of hardware of a touch screen for performing the method for determining a target operating frequency of a stylus according to the present application.

FIG. 15 is a schematic structural diagram of hardware of a touch screen for performing the method for determining a target operating frequency of a stylus according to the present application.

As illustrated in FIG. 15, the touch screen includes: at least one processor 310 and a memory 320, and FIG. 15 uses one processor 310 as an example.

The touch screen for performing the method for determining a target operating frequency of a stylus may further include an input apparatus 330 and an output apparatus 340.

The processor 310, the memory 320, the input apparatus 330 and the output apparatus 340 may be connected to each other via a bus or in another manner. FIG. 15 uses connection via a bus as an example for description.

The memory 320, as a non-volatile computer readable storage medium, may be configured to store non-volatile software programs, non-volatile computer executable programs and modules, for example, the program instructions/modules corresponding to the search signal processing method in the embodiments of the present application. The non-volatile software programs, instructions and modules stored in the memory 320, when being executed, cause the processor 310 to perform various function applications and data processing of a server, that is, performing the methods for determining a target operating frequency of a stylus in the above method embodiments.

The memory 320 may include a program memory area and data memory area, wherein the program memory area may store operation systems and application programs at least needed by the functions; and the data memory area may store data created according to the usage of the search comparing module, the search receiving module and the frequency setting module. In addition, the memory 320 may include a high speed random access memory, or include a non-volatile memory, for example, at least one disk storage device, a flash memory device, or another non-volatile solid storage device. In some embodiments, the memory 320 optionally includes memories remotely configured relative to the processor 310. These remote memories may be connected to the search signal processing apparatus over a network. Examples of the network include, but not limited to, the Internet, Intranet, local area network, mobile communication network and a combination thereof.

The input apparatus 330 may receive input digital or character information, and generate signal input related to user settings and function control of the search signal processing apparatus. The output apparatus 340 may include a display device, such as, a display screen, a communication chip or the like.

One or more modules are stored in the memory 320, and when being executed by the at least one processor 310, perform the method for determining a target operating frequency of a stylus in any of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

The touch screen in the embodiments of the present application is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, a MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device;

(4) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic device having the data interaction function.

Figure 16:
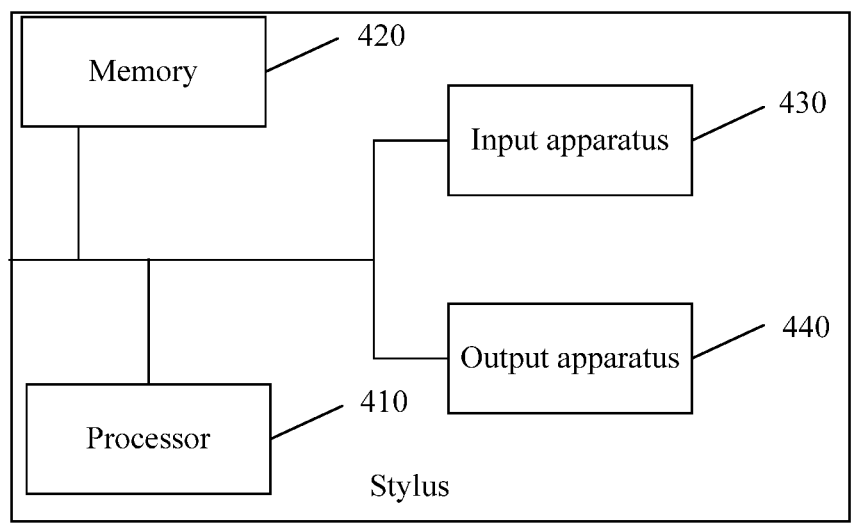
FIG. 16 is a schematic structural diagram of hardware of a stylus for performing the method for determining a target operating frequency of a stylus according to the present application.

FIG. 16 is a schematic structural diagram of hardware of a stylus for performing the method for determining a target operating frequency of a stylus according to the present application.

As illustrated in FIG. 16, the stylus includes at least one processor 410 and a memory 420, and FIG. 16 uses one processor 410 as an example.

The stylus for performing the method for determining a target operating frequency of a stylus may further include an input apparatus 430 and an output apparatus 440.

The processor 410, the memory 420, the input apparatus 430 and the output apparatus 440 may be connected to each other via a bus or in another manner. FIG. 16 uses connection via a bus as an example for description.

The memory 420, as a non-volatile computer readable storage medium, may be configured to store non-volatile software programs, non-volatile computer executable programs and modules, for example, the program instructions/modules corresponding to the methods for determining a target operating frequency of a stylus in the embodiments of the present application. The non-volatile software programs, instructions and modules stored in the memory 420, when being executed, cause the processor 410 to perform various function applications and data processing of a server, that is, performing the methods for determining a target operating frequency of a stylus in the above method embodiments.

The memory 420 may include a program memory area and data memory area, wherein the program memory area may store operation systems and application programs at least needed by the functions; and the data memory area may store data created according to the usage of the search sending module and the frequency configuring module. In addition, the memory 420 may include a high speed random access memory, or include a non-volatile memory, for example, at least one disk storage device, a flash memory device, or another non-volatile solid storage device. In some embodiments, the memory 420 optionally includes memories remotely configured relative to the processor 410. These remote memories may be connected via a network to the processing apparatus for determining a target operating frequency. Examples of the above network include, but not limited to, the Internet, Intranet, local area network, mobile communication network and a combination thereof.

The input apparatus 430 may receive input digital or character information, and generate signal input related to user settings and function control of the response signal processing apparatus. The output apparatus 440 may include a display device, such as, a display screen, a communication chip or the like.

One or more modules are stored in the memory 420, and when being executed by the at least one processor 410, perform the method for determining a target operating frequency of a stylus in any of the above method embodiments.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

The stylus in the embodiments of the present application is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, a MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device;

(4) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic device having the data interaction function.

A person skilled in the art shall understand that the embodiments may be described to illustrate methods, apparatuses (devices), or computer program products. Therefore, hardware embodiments, software embodiments, or hardware-plus-software embodiments may be used to illustrate the embodiments of the present application. In addition, the embodiments of the present application may further employ a computer program product which may be implemented by at least one non-transitory computer-readable storage medium with an executable program code stored thereon. The non-transitory computer-readable storage medium includes but not limited to a disk memory, a CD-ROM, and an optical memory.

The embodiments of the present application are described based on the flowcharts and/or block diagrams of the method, apparatus (device), and computer program product according to the embodiments of the present application. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product including an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although preferred embodiments of the present application are described, those skilled in the art may make modifications and variations to these embodiments based on the basic inventive concept of the present application. Therefore, the appended claims are interpreted as covering the preferred embodiments and all such modifications and variations falling within the protection scope of the embodiments of the present application. Apparently, a person skilled in the art may make various modifications and variations to the present application without departing from the spirit and principles of the present application. If such modifications and variations fall within the scope defined by the claims of the present application and equivalent technologies thereof, the present application is intended to cover such modifications and variations.

What is claimed is:

1. A method for determining a target operating frequency of a stylus, executed by a touch screen, the method comprising:

receiving a search signal sent by the stylus, wherein the search signal has a frequency corresponding to an operating frequency of the stylus, and detecting the frequency of the search signal;

judging whether the frequency of the search signal and a target operating frequency of the touch screen satisfy a predetermined first relationship; and if the frequency of the search signal and the target operating frequency of the touch screen satisfy the predetermined first relationship, sending a response signal to the stylus, and enabling the stylus to acquire the target operating frequency of the touch screen according to the predetermined first relationship and the frequency of the search signal, and adjusting the operating frequency of the stylus to the target operating frequency of the touch screen, wherein the response signal is obtained according to the target operating frequency of the touch screen via modulation.

2. The method according to claim 1, wherein prior to the receiving a search signal sent by the stylus, the method further comprises:

detecting noise information of the touch screen, and determining the target operating frequency of the touch screen according to the noise information.

3. The method according to claim 2, wherein the detecting noise information of the touch screen, and determining the target operating frequency of the touch screen according to the noise information comprises:

detecting noise strengths of the touch screen at each frequency, and setting a frequency with the noise strength lower than a predetermined strength threshold among the detected noise strengths as the target operating frequency of the touch screen or setting a frequency with a minimum noise strength among the detected noise strengths as the target operating frequency of the touch screen.

4. The method according to claim 3, wherein:

setting a frequency with the noise strength lower than a predetermined strength threshold among the detected noise strengths as the target operating frequency of the touch screen comprises: selecting a frequency to which the stylus can most quickly hop via a hopping function as the target operating frequency of the touch screen if there is more than one frequency with the noise strengths lower than the predetermined noise threshold, or the setting a frequency with a minimum noise strength among the detected noise strengths as the target operating frequency of the touch screen comprises: selecting a frequency to which the stylus can most quickly hop via a hopping function as the target operating frequency of the touch screen if there is more than one frequency at which the noise strength is the minimum.

5. The method according to claim 1, wherein the enabling the stylus to adjust the operating frequency of the stylus to the target operating frequency of the touch screen comprises:

enabling the stylus to determine the frequency of the search signal as the target operating frequency of the stylus if the frequency of the search signal is equal to the target operating frequency of the touch screen.

6. A method for determining a target operating frequency of a stylus, executed by the stylus, the method comprising:

sending a search signal to a touch screen, wherein the search signal has a frequency corresponding to an operating frequency of the stylus;

if the frequency of the search signal and a target operating frequency of the touch screen satisfy a predetermined first relationship, receiving a response signal sent by the touch screen, wherein the response signal is obtained according to the target operating frequency of the touch screen via modulation; and determining the target operating frequency of the touch screen according to the predetermined first relationship and the frequency of the search signal and adjusting the operating frequency of the stylus to the target operating frequency of the touch screen, if the frequency of the search signal and the target operating frequency of the touch screen satisfy the predetermined first relationship.

7. The method according to claim 6, comprising:

switching the stylus to another operating frequency and sending a next search signal to the touch screen if the frequency of the search signal and the target operating frequency of the touch screen do not satisfy the predetermined first relationship.

8. The method according to claim 6, wherein the determining the target operating frequency of the touch screen according to a predetermined first relationship and the frequency of the search signal comprises:

judging whether the frequency of the response signal and the operating frequency of the stylus satisfy a predetermined second relationship;

determining the target operating frequency of the touch screen according to the predetermined first relationship and the frequency of the search signal, if the frequency of the response signal and the current operating frequency of the stylus satisfy the predetermined second relationship; and switching the stylus to another operating frequency and sending a next search signal to the touch screen if the frequency of the response signal and the current operating frequency of the stylus do not satisfy the predetermined second relationship.

9. The method according to claim 6, wherein the determining the target operating frequency of the touch screen according to the predetermined first relationship and the frequency of the search signal if the frequency of the search signal and the target operating frequency of the touch screen satisfy the predetermined first relationship comprises:

determining the frequency of the search signal as the target operating frequency of the stylus if the frequency of the search signal is equal to the target operating frequency of the touch screen.

10. The method according to claim 9, wherein the determining the frequency of the search signal as the target operating frequency of the touch screen if the frequency of the search signal is equal to the target operating frequency of the touch screen comprises:

judging whether the frequency of the response signal is equal to the operating frequency of the stylus; and determining the frequency of the search signal as the target operating frequency of the touch screen if the frequency of the response signal is equal to the operating frequency of the stylus.

11. A touch screen, comprising a processor and a memory, the memory being configured to store instructions encoded thereon for enabling the processor to perform the operations comprising:

receiving a search signal sent by a stylus, and detecting a frequency of the search signal, wherein the frequency of the search signal corresponds to an operating frequency of the stylus;

judging whether the frequency of the search signal and a target operating frequency of the touch screen satisfy a predetermined first relationship; and sending a response signal to the stylus, and enabling the stylus to acquire the target operating frequency of the touch screen according to the predetermined first relationship and the frequency of the search signal and to adjust the operating frequency of the stylus to the target operating frequency of the touch screen, wherein the response signal is obtained according to the target operating frequency of the touch screen via modulation if the frequency of the search signal and the target operating frequency of the touch screen satisfy the predetermined first relationship.

12. The touch screen according to claim 11, wherein the operations further comprise:
   detecting a noise strength of the touch screen at each frequency, and setting a frequency with the noise strength lower than a predetermined strength threshold among the detected noise strengths as the target operating frequency of the touch screen; or
   setting a frequency with a minimum noise strength among the detected noise strengths as the target operating frequency of the touch screen.

13. The touch screen according to claim 12, wherein the operations further comprise:
   selecting a frequency to which the stylus can most quickly hop via a hopping function as the target operating frequency of the touch screen if there is more than one frequency with the noise strengths lower than the predetermined noise threshold, or
   selecting a frequency to which the stylus can most quickly hop via a hopping function as the target operating frequency of the touch screen if there is more than one frequency at which the noise strength is the minimum.

14. The touch screen according to claim 11, wherein the operations further comprise enabling the stylus to determine the frequency of the search signal as the target operating frequency of the stylus if the frequency of the search signal is equal to the target operating frequency of the touch screen.

15. A stylus, comprising a processor and a memory, the memory being configured to store instructions encoded thereon for enabling the processor to perform the operations comprising:
   sending a search signal to a touch screen, wherein the search signal has a frequency corresponding to an operating frequency of the stylus; and
   acquiring a target operating frequency of the touch screen according to a predetermined first relationship and the frequency of the search signal, and adjusting the operating frequency of the stylus to the target operating frequency of the touch screen, wherein a response signal is obtained according to the target operating frequency of the touch screen via modulation, if the frequency of the search signal and a target operating frequency of the touch screen satisfy the predetermined first relationship.

16. The stylus according to claim 15, wherein the operations further comprise:
   switching the stylus to another operating frequency and sending a next search signal to the touch screen if the frequency of the search signal and the target operating frequency of the touch screen do not satisfy the predetermined first relationship.

17. The stylus according to claim 15, wherein the operations further comprise:
   receiving the response signal sent by the touch screen if the frequency of the search signal and the target operating frequency of the touch screen satisfy the predetermined first relationship;
   judging whether a frequency of the response signal and a current operating frequency of the stylus satisfy a predetermined second relationship and switching the stylus to another operating frequency and send a next search signal to the touch screen if the frequency of the response signal and the operating frequency of the stylus do not satisfy the predetermined second relationship; and
   acquiring the target operating frequency of the touch screen according to the predetermined first relationship and the frequency of the search signal.

18. The stylus according to claim 15, wherein the operations further comprise:
   determining the frequency of the search signal as the target operating frequency of the stylus if the frequency of the search signal is equal to the target operating frequency of the touch screen; or
   receiving a response signal sent by the touch screen if the frequency of the search signal is equal to the target operating frequency of the touch screen; judging whether a frequency of the response signal is equal to a current operating frequency of the stylus; and determining the frequency of the search signal as the target operating frequency of the stylus if the frequency of the response signal is equal to the operating frequency of the stylus.

* * * * *